United States Patent
Kurian (10) Patent No.: US 10,659,451 B2
(45) Date of Patent: May 19, 2020

(54) SYSTEM AND METHOD FOR INJECTING A TAG INTO A COMPUTING RESOURCE

(71) Applicant: BANK OF AMERICA CORPORATION, Charlotte, NC (US)

(72) Inventor: Manu J. Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 156 days.

(21) Appl. No.: 15/652,614

(22) Filed: Jul. 18, 2017

(65) Prior Publication Data

US 2019/0028456 A1    Jan. 24, 2019

(51) Int. Cl.
*H04L 29/06*    (2006.01)

(52) U.S. Cl.
CPC .......... *H04L 63/083* (2013.01); *H04L 63/10* (2013.01); *H04L 63/08* (2013.01)

(58) Field of Classification Search
CPC ....... H04L 63/083; H04L 63/10; H04L 63/06; H04L 63/061; H04L 2463/062; H04L 63/045; H04L 9/14; H04L 29/06551; H04L 63/0471; H04L 63/20; G06F 21/60; G06Q 2220/10; G05B 2219/25202
See application file for complete search history.

(56) References Cited

U.S. PATENT DOCUMENTS

| | | | |
|---|---|---|---|
| 8,285,681 B2 | 10/2012 | Prahlad et al. | |
| 8,527,549 B2 | 9/2013 | Cidon | |
| 8,560,785 B1 * | 10/2013 | Malhotra | G06F 21/6218 711/162 |
| 8,762,642 B2 | 6/2014 | Bates et al. | |
| 8,788,628 B1 * | 7/2014 | Taylor | G06F 16/172 709/219 |
| 8,805,951 B1 | 8/2014 | Faibish et al. | |
| 8,805,968 B2 | 8/2014 | Taylor et al. | |
| 8,832,820 B2 | 9/2014 | Barjatiya et al. | |
| 8,849,898 B2 | 9/2014 | Tofano | |
| 8,850,130 B1 | 9/2014 | Aron et al. | |
| 9,147,195 B2 | 9/2015 | Sivaramakrishnan et al. | |
| 9,256,374 B1 | 2/2016 | Aron et al. | |

(Continued)

OTHER PUBLICATIONS https://books.google.com/books?id=OOKWBQAAQBAJ&pg=PA27&lpg=PA27&dq=Metadata+tagging+data+within+a+cloud+environment&source=bl&ots=ViMbGig5Bz&sig=ZkRS0aghcp-zUxBB7u8nLRD7uBk&hl=en&sa=X&ved=0ahUKEwjT0euM-PbSAhUkzIMKHcKrDF0Q6AEISDAJ#v=onepage&q=Metadata%20tagging%20data%20within%20a%20cloud%20environment&f=false.
https://www.ibm.com/blogs/cloud-computing/2013/08/metadata-scanning-and-security-in-the-cloud/.

*Primary Examiner* — Chau Le
*Assistant Examiner* — Hany S. Gadalla
(74) *Attorney, Agent, or Firm* — Michael A. Springs (57) ABSTRACT

In certain embodiments, a system determines to assign a computing resource to one or more users that are affiliated with an institution. The system pre-injects a first tag into a first portion of the computing resource and then assigns the computing resource to the one or more users. The first tag is associated with the institution and requires a first token to access the first portion of the computing resource. The system mid-process or post injects a second tag into a second portion of the computing resource. The second tag is associated with one of the users and requires a second token to access the second portion of the computing resource. The system controls access to the first and second portions of the computing resource based on whether subsequent requests to access the computing resource comprise the first token, the second token, or both.

17 Claims, 4 Drawing Sheets

(56) References Cited

U.S. PATENT DOCUMENTS

| | | | |
|---|---|---|---|
| 9,286,400 B2* | 3/2016 | Chakra | G06F 16/9535 |
| 9,398,087 B1 | 7/2016 | Hosie et al. | |
| 9,424,437 B1* | 8/2016 | Ancin | G06F 15/17331 |
| 9,454,398 B2 | 9/2016 | Hacker | |
| 9,565,200 B2* | 2/2017 | Bacastow | H04L 63/1408 |
| 9,596,325 B2 | 3/2017 | Xu et al. | |
| 2002/0199096 A1* | 12/2002 | Wenocur | G06Q 10/107 |
| | | | 713/153 |
| 2004/0010688 A1* | 1/2004 | Matsuzaki | G06Q 20/388 |
| | | | 713/169 |
| 2004/0243814 A1* | 12/2004 | Nakano | G11B 20/00086 |
| | | | 713/189 |
| 2007/0239761 A1* | 10/2007 | Baio | G06F 16/38 |
| 2010/0198873 A1* | 8/2010 | Falk | G06F 21/35 |
| | | | 707/784 |
| 2010/0254537 A1* | 10/2010 | Buer | G06F 21/602 |
| | | | 380/279 |
| 2013/0047254 A1* | 2/2013 | Radhakrishnan | G06F 21/335 |
| | | | 726/22 |
| 2015/0067811 A1* | 3/2015 | Agnew | H04L 63/0807 |
| | | | 726/9 |
| 2015/0356136 A1* | 12/2015 | Joshi | G06F 16/9537 |
| | | | 707/736 |
| 2017/0039218 A1 | 2/2017 | Prahlad et al. | |
| 2017/0331794 A1* | 11/2017 | Lokman | H04L 63/0428 |

* cited by examiner

SYSTEM AND METHOD FOR INJECTING A TAG INTO A COMPUTING RESOURCE

TECHNICAL FIELD

Certain embodiments of the present disclosure relate generally injecting a tag into a computing resource. Certain embodiments may use the tag injection to increase the security of the computing resource.

BACKGROUND

Computing systems use security measures to protect hardware, software, or data from maliciously caused destruction, unauthorized modification, or unauthorized disclosure. Security measures may include the use of authentication, password policies, encryption, access control, and other techniques. As an example, authentication may allow one party to verify another party's identity based on a password and/or other authentication factors. Password policies may define criteria that a password must satisfy to be considered valid, for example, a minimum number of characters, required types of characters (e.g., numbers, uppercase letters, lowercase letters, symbols), and/or a time period after which the password shall expire. Encryption may protect the privacy of information by scrambling the information in a manner that only the intended recipient can understand. Access control may grant different users different levels of access to hardware, software, or data depending on the user's credentials. Different types of security measures can be used together to provide increased security.

SUMMARY

In certain embodiments, a system determines to assign a computing resource to one or more users that are affiliated with an institution. The system pre-injects a first tag into a first portion of the computing resource and then assigns the computing resource to the one or more users. The first tag is associated with the institution and requires a first token to access the first portion of the computing resource. The system mid-process or post injects a second tag into a second portion of the computing resource. The second tag is associated with one of the users and requires a second token to access the second portion of the computing resource. The system controls access to the first and second portions of the computing resource based on whether subsequent requests to access the computing resource comprise the first token, the second token, or both.

Embodiments of the present disclosure provide technological solutions to technological problems. For example, certain embodiments may use the tag injection to increase the security of the computing resource. In certain embodiments, a tag requires a token in order to access the computing resource. In certain embodiments, multiple tags may be injected into a computing resource. For example, a tag may be pre-injected during instantiation of the computing resource, mid-process injected during the use of the computing resource, and/or post-injected to seal work during shutdown of the computing resource. Using multiple tags may allow for increased security and may facilitate auditing the computing resource. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION

For a more complete understanding of the present disclosure and for further features and advantages thereof, reference is now made to the following description taken in conjunction with the accompanying example drawings, in which.

DETAILED DESCRIPTION

According to certain embodiments of the present disclosure, tag injection can be applied to a computing resource, for example, in order to control the use of the computing resource. Examples of a computing resource include a cloud object, a hardware resource (such as an interface, memory, or processing circuitry), a software resource (such as an application), electronic data, or a collection of any one or more of the preceding (such as a collection that includes two cloud objects, a collection that includes a hardware resource and a software resource, etc.). Injecting the tag allows for determining whether the computing resource is meant for a particular user.

As an example, a system that manages computing resources may receive a request from a first user, user A. The request may ask the system to assign a computing resource, such as a cloud object, to user A. The system determines the cloud object to assign to user A, creates a tag, and injects the tag into the cloud object. The tag requires a token in order to access the cloud object. The token can be a unique strand that cannot be easily duplicated. After injecting the token, the cloud object is assigned to user A, and user A uses the token to access the assigned cloud object. Unauthorized users are prevented from accessing the cloud object because they do not have the required token. The cloud object may be further controlled by injecting one or more additional tags (e.g., a tagging chain) after the cloud object has been assigned. Each additional tag may require a respective token in order to access the cloud object. The cloud object can be de-instantiated, and the token(s) can be used to validate re-instantiation of the cloud object.

Injecting a tag into a computing resource may refer to any suitable technique for associating the computing resource with the token. In certain embodiments, injecting the tag may comprise inserting, tagging, or imprinting the computing resource with metadata that includes one or more tokens required to access the computing resource, encrypting the computing resource using the token(s), or otherwise associating the computing resource with the token(s). Tag injection can be performed automatically by a tagging system, for example, according to one or more tagging policies. In addition, or in the alternative, a user may manually initiate tag injection. User-initiated tag injection allows a user to ensure that the computing resource cannot be shared (if that is the user's intent). That is, if another user (user B) tries to use the computing resource that has been self-tagged by user A, then user B would not be able to validate and the computing resource would not be usable by user B.

Tag injection occurs at any suitable point in the process, such as pre-injection, mid-process injection, or post-injection. As an example, in certain embodiments, a tagging system may apply a policy that includes pre-injecting a first tag to instantiate the work and post-injecting a last tag as a way to seal the work. User A could initiate further tagging (such as mid-process or post injection tagging) from any suitable device, such as a personal computer, a laptop, a tablet computer, a smartphone, a mobile phone, a handheld device, a wireless device, a wearable device, etc.

Pre-injecting a tag occurs at the instantiation of the computing resource. For example, the tagging system can take some input from the user and leverage a profile of the user to create a token. One copy of the token may be made available to the user, in a visible or invisible format, and another copy may be recorded by the system (e.g., in a central, cloud-based database or other suitable location) for future validation of the user. The tagging system pre-injects the tag in order to associate the computing resource with the token. Thus, during the instantiation of the computing resource, an initial tag is attached that marks the computing resource. Later, at re-instantiation or further access, other tags can be added and/or an existing tag can be validated.

Mid-process (mid-level) injecting occurs mid work (e.g., during use of the computing resource) and injects a tag as a way to signal a stop point, a break point, or the like. It can also be used to enhance the tagging chain to increase confidence and accountability.

Post-injecting could come into place by injecting a tag when a computing resource needs to be frozen, stored for retention, or the like. This could be important for accepting or validating the computing resource (or information contained within the computing resource) for review, audit, litigation, and other purposes. Post-injecting could be implemented during shutdown as a way to finalize usage during a session.

In certain embodiments, injecting a tag may comprise creating the token associated with the tag. A token can be created using a tokenization technique that generates a unique and particular strand that would not be easily duplicated (e.g., in order to prevent intercepted data strings). Certain tokenization techniques can generate the token based on an identifier, such as an identifier associated with an institution (e.g., institution X) or an identifier associated with a user (e.g., user A), as further discussed below. The identifier can be used as an input to an algorithm that performs randomization to generate the token. Other embodiments may use other tokenization techniques that include additional or different inputs. As an example, certain embodiments may use time and date information as an input to the randomization algorithm in order to create a unique token based on whatever time the computing resource was tagged (e.g., at the time that the computing resource was created or edited). As another example, certain embodiments may allow the user to input a user-based token.

Certain embodiments create a token for a pre-injection tag based on some special "tokenized identifier" that identifies a particular institution. As an example, the tokenized identifier for institution X could be unique, similar to an 'X' signature, such that another institution Y would not be able to generate the same identifier as institution X. As an example, suppose the tokenized identifier for institution X yields the token 12345. When institution X assigns, instantiates, or issues a computing resource, it can pre-inject the computing resource with a tag that associates the computing resource with the token 12345 (i.e., the token created using institution X's token identifier).

Additionally, user-initiated tags (such as mid-process or post-injection tags) can be sewn in-line or added to the computing resource for further identification. The user-initiated tags can be associated with tokens that are generated by tokenizing an identifier that is unique to the user. As an example, suppose the tokenized identifier for user A yields the token 67890. The tag may be post-injected into the computing resource. As a result, computing resource would be associated with tokens 12345.67890, where 12345 corresponds to the pre-tag portion for institution X and 67890 corresponds to the post-tag portion for user A.

Using multiple tags may allow for different levels of control to be placed on the computing resource (or a portion of the computing resource). As an example, a tagging system may receive a request to instantiate a computing resource for user A. User A may be an employee of an institution X. The tagging system may pre-inject the requested computing resource with a first tag. The first tag requires a first token (12345) to access the computing resource, and the first token is an institution-based token available to both user A and other employees of institution X. User A may then begin to work with the computing resource, and user A may inject a mid-process tag that associates the computing resource with a second token (67890) that is specific to user A. As an example, in one embodiment, the second tag blocks other employees of institution X from accessing the computing resource (or a portion thereof). In another embodiment, the second tag restricts the access of other employees of institution X according to controls configured by user A, for example, user A could configure read-only controls for other employees of institution X.

By way of analogy, the computing resource may be analogous to a house surrounded by a fence with a locked gate. The house also includes a lock on the door. The first token may be analogous to a key for the gate. The first token allows user A and other users that have the token to pass through the gate (e.g., the other users could be other employees of institution X). Users that do not have the first token, such as users that are not employees of institution X, are prevented from passing through the gate. The second token may be analogous to a key for the door. The second token allows user A through the door (but prevents other uses from passing through the door, e.g., even if the other users are employees of institution X).

Thus, certain embodiments provide a tiered token, wherein the full token (e.g., 12345.67890) gives the user full rights, and a partial token (e.g., 12345) gives the user partial rights. For example, the computing resource may comprise a cloud object that has been allocated RAM, hard drive, and CPU. The full token would permit user A to access the full resources of the cloud object, and the partial token would allow other users to access partial resources (such as the portion of the RAM or hard drive that stores data that such users are permitted to access). In an embodiment, the full access portion of the RAM or hard drive can include private data, and the partial access portion of the RAM or hard drive contains only public data.

Although the previous examples have described two levels of tags, additional tags could be used to provide additional granularity for the controls. Granularity could be provide for a group of users as well as a first subset, a second subset, . . . and an $n^{th}$ subset of the users, wherein each subset includes one or more of the users in the group. For example, in an office environment, controls could be configured at the level of user, team, department, office, institution, and/or other suitable levels of granularity. As another example, in a family environment, controls could be configured at the levels of extended family, immediate family, adults, children, individual family members, etc. Accordingly, a user could use different tags to access different computing resources (or different portions within a computing resource). In one embodiment, tag #1 would instantiate or spin up an instance of a cloud object with work-related resources, tag #2 would instantiate or spin up an instance of a cloud object for adults, tag #3 for kids, etc. Tag #1 could cause the system to initiate increased controls over its usage. This could include recording of activities for security review. Tag #3 could initiate more control and audit checkpoints along with proactive measures to detect adult or non-acceptable parameters (adult content, etc.).

In certain embodiments, using multiple tags may allow for different levels of validation to be placed on the computing resource (or a portion of the computing resource). For example, the computing resource may comprise data to be transmitted from a source node to a destination node via a path of intermediate nodes. One or more of the nodes may be configured to inject a tag when the data passes through the node. The nodes can inject the tags into any suitable location within the data. In a split-token embodiment, the nodes inject the tags into multiple locations, such as the head, tail, and/or one or more midpoints (e.g., 30% mark, 40% mark, etc.). The end system deciphers the break points and re-combines the split token.

In certain embodiments, the data being transmitted from the source node to the destination node can be injected with the tags in order to prevent unauthorized users from intercepting and accessing the data that traverses the nodes. As an example, the token can be used to sign/encrypt data, and the data can only be read if the user has the decrypter corresponding to the token. Thus, if the data is intercepted by an unauthorized user, it is useless because the unauthorized user cannot decrypt it. Additionally, tags can also be used to later validate the data based on whether it includes tags injected by the source node, intermediate node(s), and/or destination node. In certain embodiments, the tags may be used to validate the path used to transmit the data, for example, in the event that some or all of the data is sent on more than one path (e.g., multiple copies of the data could be sent over multiple paths for redundancy purposes, or the data could be split and different portions could be sent over different paths for security purposes).

Any suitable method may be used to validate that user A has the token required to access the computing resource assigned to user A. In certain embodiments, user A provides an identifier that can be used as a token or used as input to a function that generates the token. The identifier could comprise any one or more of a passcode that the user enters manually, proximity information indicating the proximity of a device known to belong to the user (such as a cell phone or a wearable device, such as a watch), biometric information (such as recognition based on user A's finger print, facial features, voice, or heartbeat), a cookie stored on the user's device, etc.

In certain embodiments, if a user, profile, device, or system does not use the token required by a tag associated with a computing resource, the computing resource could be provided in a controlled/constricted mode that limits the data, resources, access, and/or capabilities provided to that user/profile/device/system. For example, a computing resource could be injected with a tag that is specific to user A. The tag would permit user A to instantiate the computing resource and to initiate the injection of additional tags (e.g., mid-process injection or post injection). User/profile/device/system B not using the correct token would run in a constricted mode that can include limiting the data, resources, access, and/or capabilities available to B.

In certain embodiments, users can use tagging when sharing computing resources. The tags can be used to create silos for downstream use of computing resources (such as cloud objects). As an example, user A may be assigned a computing resource that comprises a 5G hard drive. User A can tag a portion of the hard drive with a token and may share that token with user B. User B can unlock his portion of the hard drive using the token. User B can add user B's tag to his portion of the hard drive, for example, for audit purposes to indicate that user B has modified data in his portion of the hard drive or for the purpose of further controlling access to that portion of the hard drive. In certain embodiments, user B may be able to further share a portion of his portion with another user C.

Additionally, tags can be inserted into an auditing system for full review. An example use case could be a user using multiple cloud profiles and each tagged with different behaviors. In certain embodiments, a user may have different profiles for different purposes. For example, a user could have a work profile and a home profile. In some embodiments, geodata may be used to prioritize which profile to access. For example, if the user is wearing a GPS-capable watch (or other wearable device), the user's work profile could be prioritized when the GPS data shows the user located near work and the user's home profile could be prioritized when the GPS data shows the user located near home. Proximity sensors or other techniques could be used to determine the user's location (e.g., prioritize the user's work profile when the user is proximate to a work phone). If the user attempts to use home-specific tokens to access the home profile from work (or if the user attempts to use work-specific tokens to access the work profile from home), an alert can be generated to confirm which profile the user wishes to access.

Figure 1:
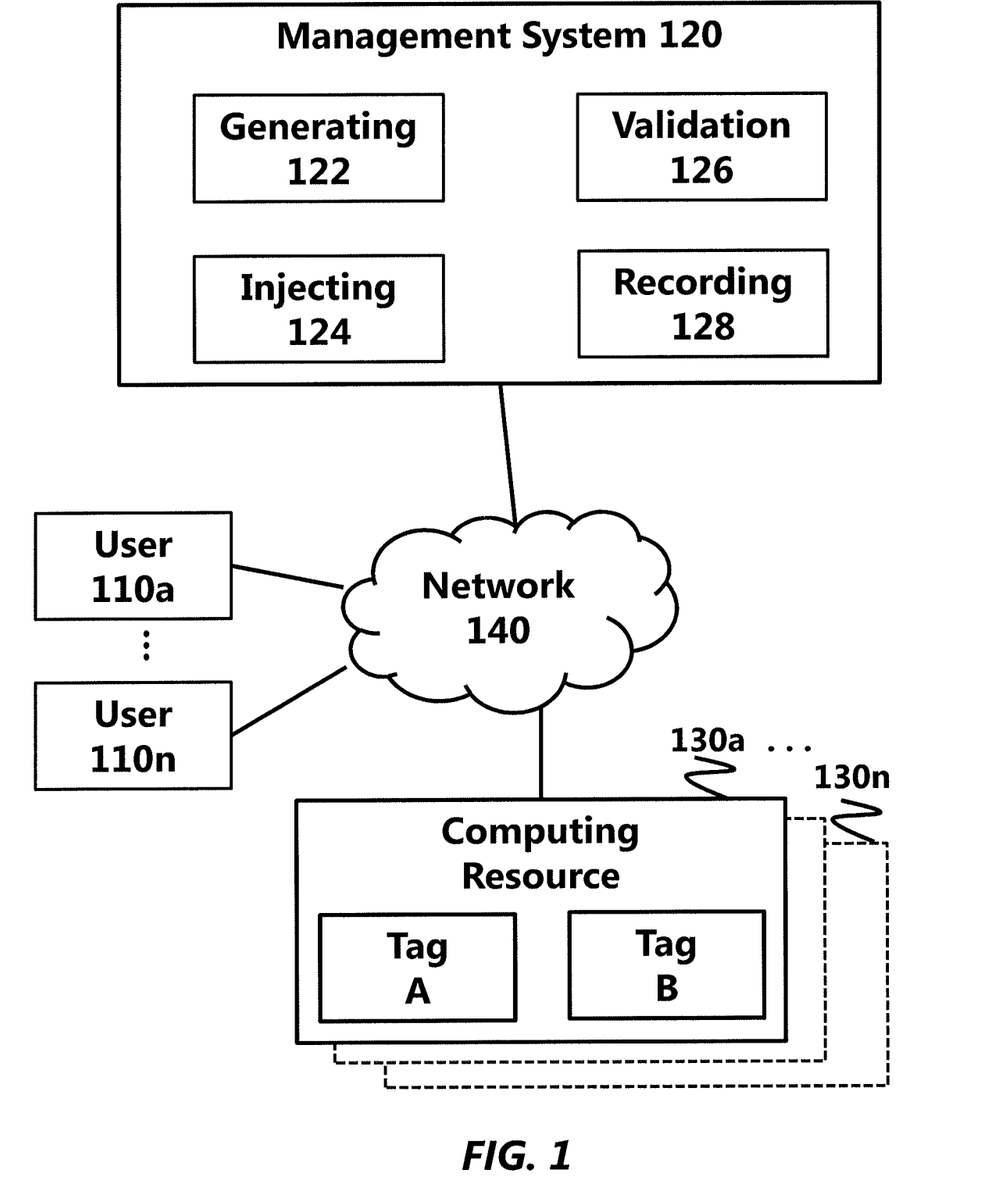
FIG. 1 illustrates an example system for injecting a tag into a computing resource, in accordance with certain embodiments.

Certain embodiments of the above-discussed features may be implemented in accordance with one or more of FIGS. 1-4. FIG. 1 illustrates a system for injecting a tag into a computing resource. In certain embodiments, the system includes one or more users 110*a*-*n*, management system 120, computing resources 130*a*-*n*, and network 140. In general, management system 120 manages computing resources 130 for users 110. For example, management system 120 facilitates assigning, instantiating, and/or controlling access to computing resources 130.

In certain embodiments, management system 120 includes one or more of generating engine 122, injecting engine 124, validation engine 126, and recording engine 128. Generating engine 122 generates tags for computing resources 130, and injecting engine 130 injects the tags into the computing resources 130. The tag injected into the computing resource 130 may indicate that a corresponding token is required to access that computing resource 130. Validation engine 126 validates whether user 110's request to access a computing resource 130 includes the required token. Recording engine 128 records the tokens generated by generating engine 122 for future use by validation engine 126. Recording engine 128 may record any other suitable information, such as audit records, records of attempts or failures to access a computing resource 130, etc. Management system 120 may comprise a server, a cloud-based system, or other suitable system. In certain embodiments, management system 120 may be associated with an institution (e.g., management system 120 may be within an enterprise network of the institution or hosted by a cloud service provider on behalf of the institution).

User 110 is a non-limiting term that generally refers to a user of a computing resource 130. Examples of a user could include a device, such as a personal computer, a laptop, a tablet computer, a smartphone, a mobile phone, a handheld device, a wireless device, a wearable device, etc. Depending on the context, a user may refer to a person that enters input and receives output from such a device, or an account or profile associated with that person. As an example, a person might use a mobile phone to access a work-related computing resource 130a and a home-related computing resource 130b. Certain embodiments may consider a profile used to access the work-related computing resource 130a as one user, and may consider a profile used to access the home related computing resource 130b as a different user (even though the profiles belong to the same person and run on the same mobile phone). In certain embodiments, a computing resource 130 may comprise data and the user may be a node that transmits the data.

Examples of a computing resource 130 include a cloud object, a hardware resource (such as an interface, memory, or processing circuitry), a software resource (such as an application), electronic data, or a collection of any one or more of the preceding (such as a collection that includes two cloud objects, a collection that includes a hardware resource and a software resource, etc.).

Network 140 represents any suitable network(s) operable to facilitate communication between users 110, management system 120, and computing resources 130. Network 140 may include any interconnecting system capable of transmitting audio, video, signals, data, messages, or any combination of the preceding. Network 140 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

For purposes of example and explanation, FIG. 1 depicts the network as including certain components. However, this disclosure recognizes that the network may include any suitable components. One of ordinary skill in the art will appreciate that certain components can be omitted and other components not mentioned herein can be added.

Figure 2:
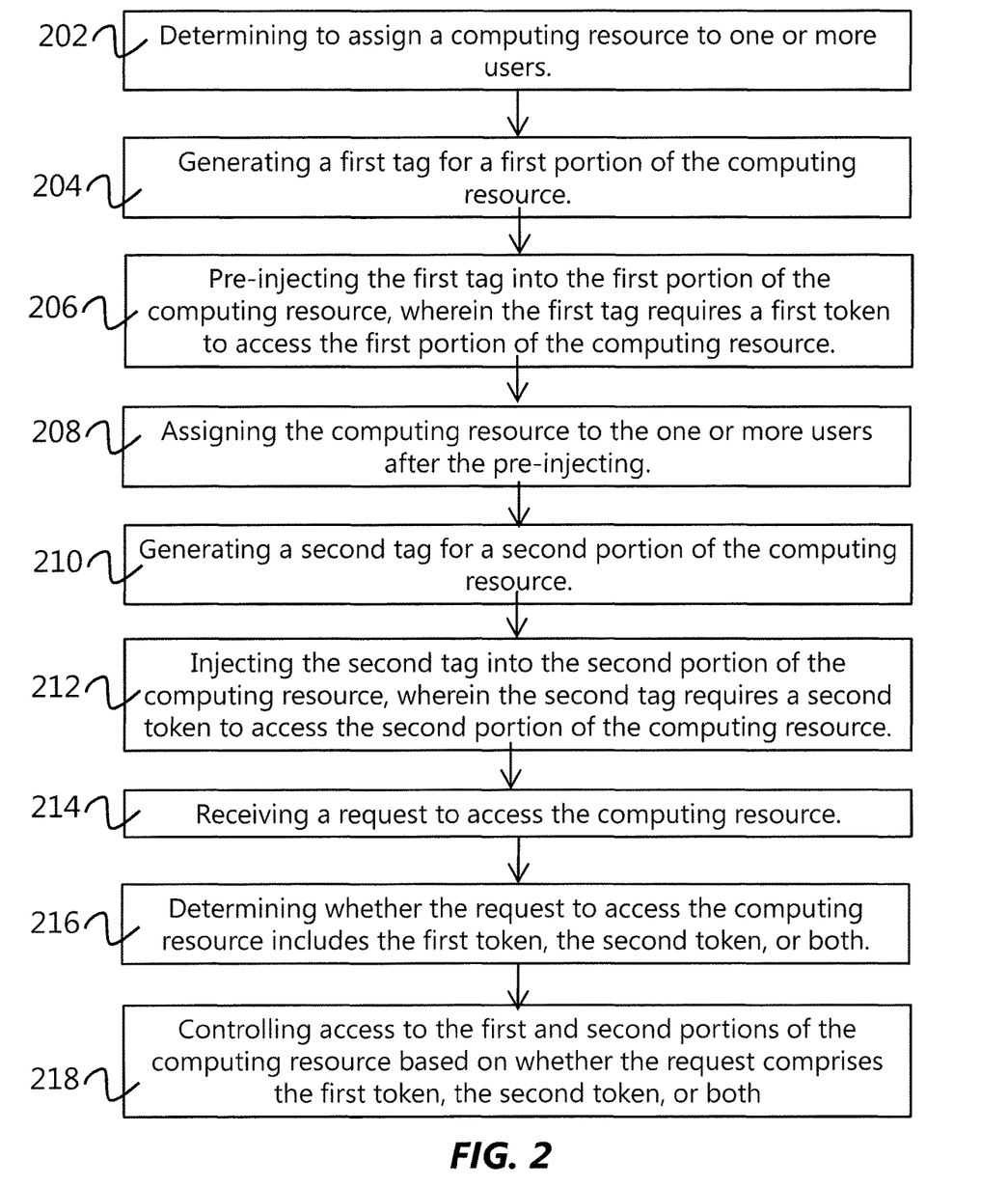
FIG. 2 illustrates an example method of using tags to control access to a computing resource, in accordance with certain embodiments.

FIG. 2 illustrates a method of using tags to control access to a computing resource. In certain embodiments, the method may be performed using the system described with respect to FIG. 1. At step 202, the method determines to assign a computing resource 130. The computing resource 130 can be assigned to a user 110 or to a group of users 110 (such as employees or customers of an institution, members of a family, or any other suitable group or subgroup of users 110 that would like the ability to share the computing resource 130 or a portion thereof).

In certain embodiments, the determination to assign a computing resource 130 can be made by management system 120 as part of a provisioning procedure or in response to a request from one of the users 110. Examples of a computing resource 130 include a cloud object, a hardware resource (such as an interface, memory, or processing circuitry), a software resource (such as an application), electronic data, or a collection of any one or more of the preceding (such as a collection that includes two cloud objects, a collection that includes a hardware resource and a software resource, etc.). The particular computing resource 130 assigned at step 202 can be tailored to the needs of the one or more users 110.

At step 204, the method generates a first tag (e.g., tag A) for a first portion of the computing resource 130 that is being assigned to the one or more users 110. In certain embodiments, generating engine 122 of management system 120 generates the tag. Generating the tag can include generating a token (e.g., token A) that will be required to access the first portion of the computing resource 130. The token can be generated according to any suitable tokenization technique. As one example, generating engine 122 determines that computing resource 130 is being assigned to a user 110 affiliated with an institution X. In an embodiment, this affiliation could be determined based on a profile that management system 120 maintains for user 110. In response to determining that user 110 is affiliated with institution X, generating engine 122 generates a token associated with institution X. For example, generating engine 122 may use a randomization algorithm that uses an identifier of institution X as an input. Optionally, the randomization algorithm could use additional inputs, such as date and time information.

In certain embodiments, generating engine 122 communicates token A to injecting engine 124 to inject the tag into the computing resource 130, to recording engine 128 to record the token for future validation, and to the user(s) 110 being assigned the first portion of the computing resource 130.

At step 206, the method pre-injects the first tag (tag A) into the first portion of the computing resource 130 being assigned to the one or more users 110. The first tag requires the first token (token A) to access the first portion of the computing resource 130. In general, injecting may comprise inserting, tagging, or imprinting the first portion of the computing resource 130 with metadata that includes token A, associates the first portion of the computing resource 130 with token A, or uses token A to encrypt the first portion of the computing resource 130.

The first portion of computing resource 130 comprises some or all of the computing resource 130, depending on the embodiment. For example, suppose the computing resource 130 being assigned comprises a collection of two cloud objects. The entire computing resource 130 could be configured for restricted use by including both of the cloud objects in the first portion such that accessing either cloud object would require token A. Alternatively, the first portion could include only one of the cloud objects. That is, one of the cloud objects could be configured for restricted use and the other cloud object could be configured for non-restricted use.

In certain embodiments, injecting engine 124 of management system 120 pre-injects the tag. Pre-injecting the tag occurs during instantiation of the computing resource 130. Continuing with the previous example, management system 120 can be configured to apply a policy that determines whether computing resource 130 is being assigned to a user 110 that is affiliated with institution X (such as an employee or customer of institution X) and, if so, to pre-inject the computing resource 130 with the token associated with institution X.

At step 208, the method assigns the computing resource 130 to the one or more users 110 after pre-injecting the computing resource 130 with the first tag. The assigning can be performed by management system 120. Once the computing resource 130 has been assigned, the user(s) 110 can interact with the computing resource 130. Tag A requires users 110 to provide token A to interact with the first portion of the computing resource 130. If the computing resource 130 comprises a non-restricted portion (i.e., a portion that has not been injected with any tag), users 110 would not be required to provide token A in order to interact with that portion of computing resource 130.

At step 210, the method generates a second tag (e.g., tag B) for a second portion of the computing resource 130. In certain embodiments, generating engine 122 of management system 120 generates the tag. Generating the tag can include generating a second token (e.g., token B) that will be required to access the second portion of the computing resource 130. The second token is different than the first token. The tag can be generated in response to a request from a user to inject a user-based tag, in response to a policy (e.g., a policy to generate a tag based on event, such as when a computing resource is shutdown), etc. For example, in certain embodiments, the system described in FIG. 1 may include a communication beacon/interface that would create the communication bridge between a user's device (mobile, wearable, etc.) to send some unique/self-identifying string to a mid-process injection sub-engine of injecting engine 124.

The second portion can include some or all of the computing resource 130. Depending on the embodiment, the second portion can overlap the first portion in whole, in part, or not at all. As one example, the first portion could be a cloud object assigned to a group of users, and the second portion could be a subset of data contained within the cloud object that is private to user A. Generating engine 122 could generate token B based on input from user A or a profile associated with user A. For example, generating engine 122 could generate token B by using a randomization algorithm that uses an identifier of user A as an input. Optionally, the randomization algorithm could use additional inputs, such as date and time information. Other embodiments could use other types of tokens.

In certain embodiments, generating engine 122 communicates token B to injecting engine 124 to inject the tag into the computing resource 130, to recording engine 128 to record the token for future validation, and to the user A.

At step 212, the method injects the second tag (tag B) into the second portion of the computing resource 130. The second tag requires the second token (token B) to access the second portion of the computing resource 130. In certain embodiments, injecting engine 124 of management system 120 injects the tag. In general, injecting may comprise inserting, tagging, or imprinting the second portion of the computing resource 130 with metadata that includes token B, associates the second portion of the computing resource 130 with token B, or uses token B to encrypt the second portion of the computing resource 130. Step 212 may comprise mid-process injecting or post-injecting, each of which are described above.

At step 214, the method receives a request to access the computing resource 130. As discussed above with reference to steps 202-212, the computing resource 130 comprises the first tag (tag A) that requires the first token (token A) to access the first portion of the computing resource 130, and the second tag (tag B) that requires the second token (token B) to access the second portion of the computing resource. In certain embodiment, the request is sent from user 110 to management system 120.

At step 216, the method determines whether the request to access the computing resource 130 includes the first token, the second token, or both. At step 218, the method controls access to the first portion of the computing resource 130 and/or the second portion of the computing resource 130 based on whether the request comprises the first token (token A), the second token (token B), or both (see the below discussion of FIG. 3 for an example). In certain embodiments, validation engine 126 of management system 120 obtains the tokens from recording engine 128. Validation engine 126 compares the token that user 110 provides in the request to the token obtained from the recording engine 128. Validation engine 126 provides user 110 with access to the portions of computing resource 130 for which user 110 has provided the corresponding token.

Controlling access to a portion of the computing resource 130 comprises limiting access to requests that do not include the corresponding token. Depending on the embodiment, limiting access could mean denying access altogether, or it could mean providing less than full access (e.g., read-only access). Additionally, in the case where the first and second portions of the computing resource 130 overlap, such as when the second portion is contained within the first portion, different levels of control can be configured depending on which tokens user 110 provides in the request of step 214. As an example, user 110 may be denied access to the second portion if user 110 fails to provide either token, user 110 may be granted read-only access if user 110 provides only the first token, and user 110 may be granted read and write access if user 110 provides both tokens. Thus, access can be limited for requests that do not include both the first token and the second token.

In certain embodiments, controlling access comprises determining security and/or audit requirements based on whether the request comprises the first token, the second token, or both. The security and/or audit requirements for a user 110 that provides the valid token(s) may be less stringent than the security and/or audit requirements for a user that does not provide the valid tokens (or that provides fewer valid tokens). As an example, a user 110 that does not provide a valid token may have to input more passwords or answer more security questions than a user that provides the valid token.

Other embodiments may use other techniques for controlling access. For example, in embodiments that use the token to encrypt computing resource 130, access to the computing resource 130 may be controlled based on whether user 110 has the decrypter that corresponds to the token.

Figure 3:
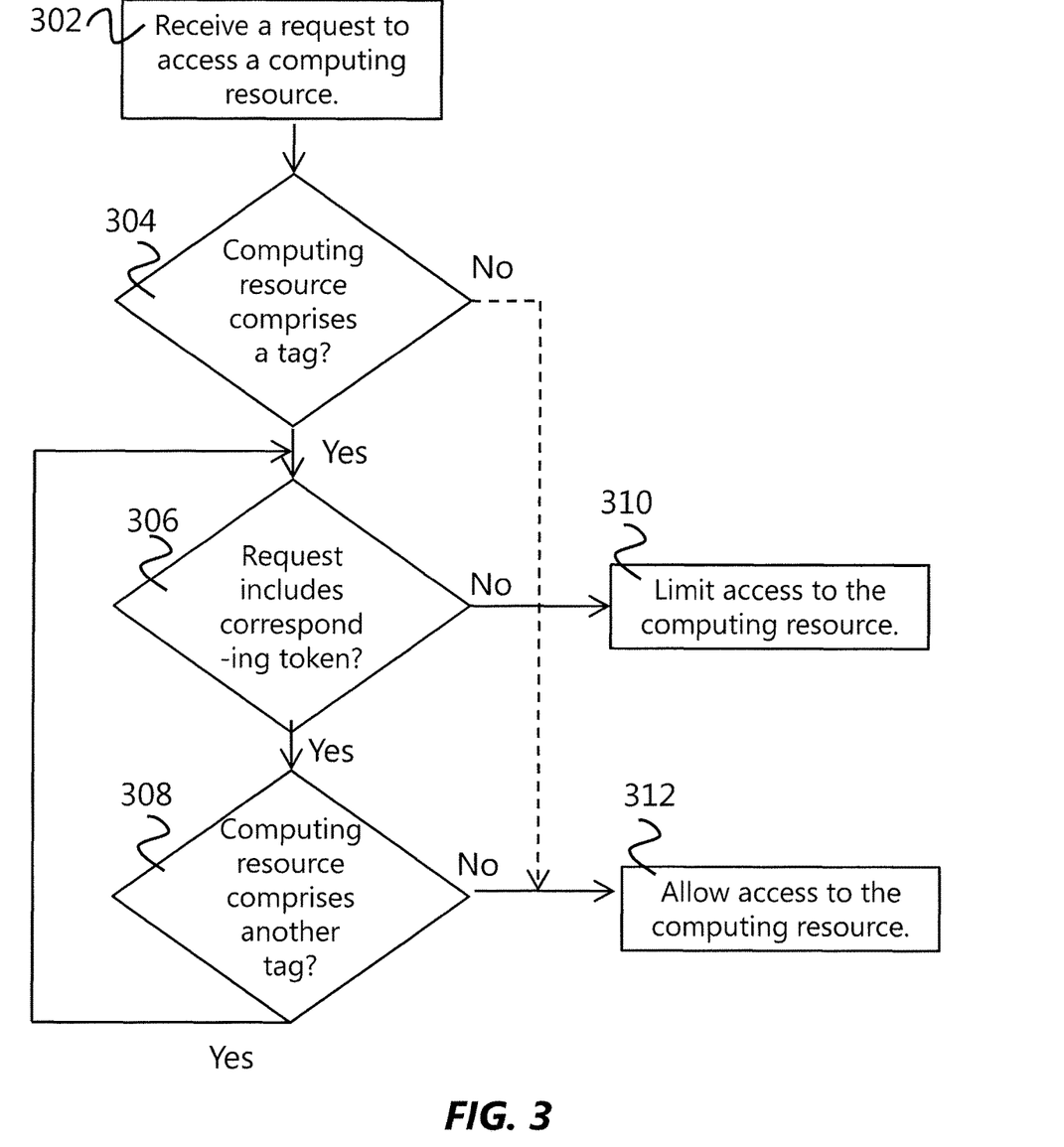
FIG. 3 illustrates an example method of using tags to control access to a computing resource.

FIG. 3 illustrates a method of using tags to control access to a computing resource. At step 302, the method receives a request to access a computing resource 130. At step 304, the method determines whether the computing resource 130 comprises a tag. If step 304 determines that the computing resource 130 does not comprise a tag, the method proceeds to step 312 where the user is allowed access to computing resource 312. If step 304 determines that the computing resource does comprise a tag, the method proceeds to step 306 to determine whether the request includes the token corresponding to the tag. For example, if computing resource comprises tag A, step 306 determines whether the request includes token A. If step 306 determines that the request does not include the corresponding token, the method proceeds to step 310 where user 110's access to computing resource 130 is limited. Limiting access could mean denying access altogether or providing less than full access. If step 306 determines that the request includes the corresponding token (e.g., token A), the method proceeds to step 308 to determine whether computing resource 130 comprises another tag, such as tag B. If yes, the method returns to step 306 to determine whether the request includes the corresponding token, such as token B. If no, the method proceeds to step 312 to allow access to the computing resource 130.

Figure 4:
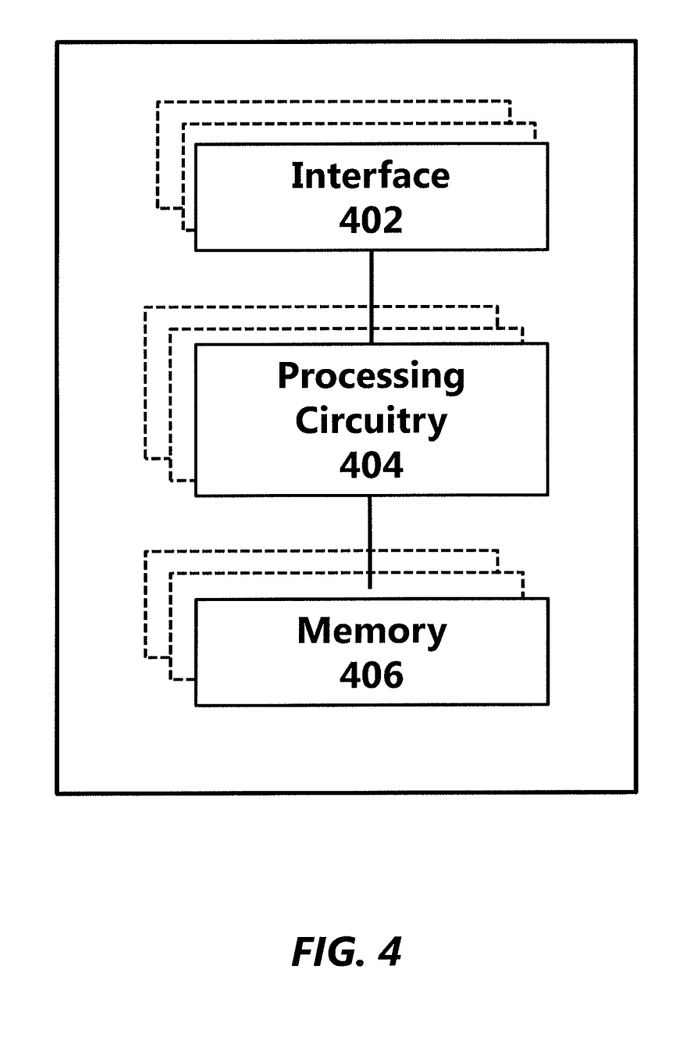
FIG. 4 illustrates an example of components for the system of FIG. 1, in accordance with certain embodiments.

FIG. 4 illustrates examples of components that may be used to implement any of the structures illustrated in FIG. 1, such as user 110, management system 120 (including any engine of management system 120), computing resource 130, and/or network 140. The components may comprise any suitable hardware and/or software configured to perform the functionality described above. The components may be implemented using shared hardware or separate hardware. In certain embodiments, components may be distributed in a cloud network environment.

In certain embodiments, the components comprise one or more interfaces 402, processing circuitry 404, and/or memory 406. In general, processing circuitry 404 controls the operation and administration of a structure by processing information received from memory 406 and/or interface 402. Memory 406 stores, either permanently or temporarily, data or other information processed by processing circuitry 404 or received from interface 402. Interface 402 receives input, sends output, processes the input and/or output and/or performs other suitable operations. An interface 402 may comprise hardware and/or software.

Examples of interfaces 402 include user interfaces, network interfaces, and internal interfaces. Examples of user interfaces include one or more graphical user interfaces (GUIs), displays, buttons, printers, microphones, speakers, cameras, scanners, credit card readers, check readers, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 404 to exchange information with or through a network. Internal interfaces receive and transmit information among internal components of a structure.

Processing circuitry 404 communicatively couples to interface(s) 402 and memory 406, and includes any hardware and/or software that operates to control and process information. Processing circuitry 404 may include a programmable logic device, a microcontroller, a microprocessor, any suitable processing device, or any suitable combination of the preceding. Processing circuitry 404 may execute logic stored in memory 406. The logic is configured to perform functionality described herein. In certain embodiments, the logic is configured to perform the methods described with respect to FIG. 2 and/or FIG. 3.

Memory 406 includes any one or a combination of volatile or non-volatile local or remote devices suitable for storing information. For example, memory may include Read Only Memory ("ROM"), Random Access Memory ("RAM"), magnetic storage devices, optical storage devices, or any other suitable information storage device or a combination of these devices. Memory 406 may be local/integrated with the hardware used by processing circuitry 404 and/or remote/external to the hardware used by processing circuitry 404.

Certain embodiments of the tag injection techniques described herein may provide advantages compared to conventional token-based authentication. For example, conventional tokens are typically randomly generated and machine driven. By contrast, certain embodiments of the token tag injection techniques described herein would add elements, such as "institution" or "personal" elements, to create a distinct tag that cannot be generated or decrypted externally. The token tag insertion would then fingerprint and enable and initiate anti-compromise measures that can be broken if there is a disturbance or break. For example, if a tag was determined to be compromised, the resources associated with the tag would shut off or spin down. Thus, certain embodiments of the tag injection techniques described herein may allow users to make unique connections (e.g., "personal" or "institution") to a computing resource allowing for a tightly-coupled relationship tag. In addition, certain embodiments may prevent the risk of a man-in-the-middle attack. Conventionally, a man in the middle would create a fake object, a user would inadvertently enter their login credentials to the fake object, and the login credentials would become compromised as a result. Embodiments of the present disclosure allow the user to use the tag to verify that the object is authentic before entering the user's login credentials.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system, comprising:
an interface operable to receive requests from a network; and
processing circuitry operable to:
assign a first tag onto a first portion of a computing resource, wherein assigning the first tag onto the first portion of the computing resource comprises:
generating a first token based on a tokenized identifier for an institution; and
encrypting the first portion of the computing resource using the first token, wherein:
the first token is associated with the first tag;
the first token is required to access the first portion of the computing resource; and
the first token is associated with a first user and a second user;
receive a tagging request from the first user;
inject a second tag into a second portion of the computing resource in response to the tagging request, wherein injecting the second tag onto the second portion of the computing resource comprises:
generating a second token based on the tokenized identifier for the institution and a tokenized identifier for the first user; and
encrypting the second portion of the computing resource with the second token, wherein:
the second token is associated with the second tag;
the second token is required to access the second portion of the computing resource; and
the second tag restricts access to the second portion of the computing resource for the second user;
receive a request to access the computing resource;
determine whether the request to access the computing resource includes the first token, the second token, or both; and
control access to the first portion of the computing resource and the second portion of the computing resource based on whether the request comprises the first token, the second token, or both.

2. The system of claim 1, wherein the first user and the second user are affiliated with an institution.

3. The system of claim 1, wherein to inject the second tag into the second portion of the computing resource, the processing circuitry is operable to post-inject the second tag.

4. The system of claim 1, wherein to inject the second tag into the second portion of the computing resource, the processing circuitry is operable to mid-process inject the second tag.

5. The system of claim 1, wherein to control access to the first portion of the computing resource, the processing circuitry is operable to limit access to requests that do not include the first token.

6. The system of claim 1, wherein the first portion of the computing resource contains the second portion of the computing resource, and wherein to control access to the second portion of the computing resource, the processing circuitry is operable to limit access to requests that do not include both the first token and the second token.

7. The system of claim 1, wherein to control access, the processing circuitry is operable to determine security and/or audit requirements based on whether the request comprises the first token, the second token, or both.

8. The system of claim 1, wherein the computing resource comprises one or more of a cloud object, an application, a processor, a memory, an interface, data, a hardware resource, and/or a software resource.

9. A method, comprising:
assigning, by a management system, a first tag onto a first portion of a computing resource, wherein assigning the first tag onto the first portion of the computing resource comprises:
generating a first token based on a tokenized identifier for an institution; and
encrypting the first portion of the computing resource using the first token, wherein:
the first token is associated with the first tag;
the first token is required to access the first portion of the computing resource; and
the first token is associated with a first user and a second user;
receiving, by the management system, a tagging request from the first user;
injecting, by the management system, a second tag into a second portion of the computing resource in response to the tagging request, wherein injecting the second tag onto the second portion of the computing resource comprises:
generating a second token based on the tokenized identifier for the institution and a tokenized identifier for the first user; and
encrypting the second portion of the computing resource with the second token, wherein:
the second token associated with the second tag;
the second token is required to access the second portion of the computing resource; and
the second tag restricts access to the second portion of the computing resource for the second user;
receiving, by the management system, a request to access the computing resource;
determining, by the management system, whether the request to access the computing resource includes the first token, the second token, or both; and
controlling, by the management system, access to the first portion of the computing resource and the second portion of the computing resource based on whether the request comprises the first token, the second token, or both.

10. The method of claim 9, wherein:
the first user and the second user are affiliated with an institution.

11. The method of claim 9, wherein injecting the second tag into the second portion of the computing resource comprises post-injecting the second tag.

12. The method of claim 9, wherein injecting the second tag into the second portion of the computing resource comprises inter-injecting the second tag.

13. The method of claim 9, wherein controlling access to the first portion of the computing resource comprises limiting access to requests that do not include the first token.

14. The method of claim 9, wherein the first portion of the computing resource contains the second portion of the computing resource, and wherein controlling access to the second portion of the computing resource comprises limiting access to requests that do not include both the first token and the second token.

15. The method of claim 9, wherein controlling access comprises determining security and/or audit requirements based on whether the request comprises the first token, the second token, or both.

16. A non-transitory computer readable medium comprising logic that, when executed by processing circuitry, is operable to:
assign a first tag onto a first portion of a computing resource, wherein assigning the first tag onto the first portion of the computing resource comprises:
generating a first token based on a tokenized identifier for an institution; and
encrypting the first portion of the computing resource using the first token, wherein:
the first token associated with the first tag;
the first token is required to access the first portion of the computing resource; and
the first token is associated with a first user and a second user;
receive a tagging request from the first user;
inject a second tag into a second portion of the computing resource in response to the tagging request, wherein injecting the second tag onto the second portion of the computing resource comprises:
generating a second token based on the tokenized identifier for the institution and a tokenized identifier for the first user; and
encrypting the second portion of the computing resource with the second token, wherein:
the second token associated with the second tag;
the second token is required to access the second portion of the computing resource; and
the second tag restricts access to the second portion of the computing resource for the second user;
receive a request to access the computing resource;
determine whether the request to access the computing resource includes the first token, the second token, or both; and
control access to the first portion of the computing resource and the second portion of the computing resource based on whether the request comprises the first token, the second token, or both.

17. The non-transitory computer readable medium of claim 16, wherein:
the first user and the second user are affiliated with an institution.

* * * * *